(12) United States Patent
Guim Bernat et al.

(10) Patent No.: US 12,253,948 B2
(45) Date of Patent: Mar. 18, 2025

(54) SOFTWARE-DEFINED COHERENT CACHING OF POOLED MEMORY

(71) Applicant: Intel Corporation, Santa Clara, CA (US)

(72) Inventors: Francesc Guim Bernat, Barcelona (ES); Karthik Kumar, Chandler, AZ (US); Alexander Bachmutsky, Sunnyvale, CA (US); Zhongyan Lu, Beijing (CN); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 17/092,803

(22) Filed: Nov. 9, 2020

(65) Prior Publication Data

US 2021/0064531 A1    Mar. 4, 2021

(51) Int. Cl.
*G06F 12/08* (2016.01)
*G06F 12/0817* (2016.01)

(52) U.S. Cl.
CPC .... *G06F 12/0828* (2013.01); *G06F 2212/621* (2013.01)

(58) Field of Classification Search
CPC ............ G06F 12/0868; G06F 12/0284; G06F 12/0888; G06F 12/0292; G06F 12/128;
(Continued)

(56) References Cited

U.S. PATENT DOCUMENTS 9,811,276 B1 * 11/2017 Taylor ................... G06F 3/0688
10,511,694 B2 * 12/2019 Goyal ................... G06F 9/5055
(Continued)

FOREIGN PATENT DOCUMENTS

EP    3382544 A1 * 10/2018 ........... G06F 3/0604
EP    3629161 A1 *  4/2020 ........... G06F 12/084
(Continued)

OTHER PUBLICATIONS

C. Pinto et al., "ThymesisFlow: A Software-Defined, HW/SW co-Designed Interconnect Stack for Rack-Scale Memory Disaggregation," 2020 53rd Annual IEEE/ACM International Symposium on Microarchitecture (MICRO), Athens, Greece, 2020, pp. 868-880.*
(Continued)

*Primary Examiner* — Pierre Michel Bataille
(74) *Attorney, Agent, or Firm* — Compass IP Law PC

(57) ABSTRACT

Methods and apparatus for software-defined coherent caching of pooled memory. The pooled memory is implemented in an environment having a disaggregated architecture where compute resources such as compute platforms are connected to disaggregated memory via a network or fabric. Software-defined caching policies are implemented in hardware in a processor SoC or discrete device such as a Network Interface Controller (NIC) by programming logic in an FPGA or accelerator on the SoC or discrete device. The programmed logic is configured to implement software-defined caching policies in hardware for effecting disaggregated memory (DM) caching in an associated DM cache of at least a portion of an address space allocated for the software application in the disaggregated memory. In connection with DM cache operations, such as cache lines evicted from a CPU, logic implemented in hardware determines whether a cache line in a DM cache is to be evicted and implements the software-defined caching policy for the DM cache including associated memory coherency operations.

20 Claims, 11 Drawing Sheets

(58) Field of Classification Search
CPC .............. G06F 12/0828; G06F 12/127; G06F 2212/284; G06F 2212/657; G06F 12/0833; G06F 2212/261; G06F 2212/1048; G06F 2212/154; G06F 2212/1016; G06F 2212/306; G06F 2212/621; G06F 12/0811; G06F 12/1036; H04L 67/568; H04L 67/566; H04L 45/742

See application file for complete search history.

(56) References Cited

U.S. PATENT DOCUMENTS

| | | | |
|---|---|---|---|
| 2011/0072213 | A1 | 3/2011 | Nickolls et al. |
| 2015/0186287 | A1 | 7/2015 | Kass |
| 2019/0042451 | A1 | 2/2019 | Leone et al. |
| 2019/0250857 | A1 | 8/2019 | Reddy et al. |
| 2020/0278935 | A1 | 9/2020 | Borikar et al. |
| 2022/0066935 | A1* | 3/2022 | Tavallaei ............ G06F 12/0895 |

FOREIGN PATENT DOCUMENTS

| | | | | |
|---|---|---|---|---|
| WO | 2020096639 A1 | 5/2020 | | |
| WO | WO-2020186081 A1 * | 9/2020 | .......... | G06F 11/1004 |

OTHER PUBLICATIONS

M. Bielski, C. Pinto, D. Raho and R. Pacalet, "Survey on Memory and Devices Disaggregation Solutions for HPC Systems," 2016 IEEE Intl Conference on Computational Science and Engineering (CSE) and IEEE Intl Conference on Embedded and Ubiquitous Computing (EUC) and 15th Intl Symposium on Distributed Computing and Ap.*

K. Lim et al., "System-level implications of disaggregated memory," IEEE International Symposium on High-Performance Comp Architecture, New Orleans, LA, USA, 2012, pp. 1-12.*

Extended European Search Report for Patent Application No. 21198635.1, Mailed Apr. 7, 2022, 13 pages.

European First Office Action, (EP Exam Report Article 94(3) EPC), for Patent Application No. 21198635.1, Mailed Dec. 16, 2024, 8 pages.

* cited by examiner

SOFTWARE-DEFINED COHERENT CACHING OF POOLED MEMORY

BACKGROUND INFORMATION

Resource disaggregation is becoming increasingly prevalent in emerging computing scenarios such as cloud (aka hyperscaler) usages, where disaggregation provides the means to manage resource effectively and have uniform landscapes for easier management. While storage disaggregation is widely seen in several deployments, for example, Amazon S3, compute and memory disaggregation is also becoming prevalent with hyperscalers like Google Cloud.

FIG. 1 shows an example of disaggregated architecture. Compute resources, such as multi-core processors (aka CPUs (central processing units)) in blade servers or server modules (not shown) in two compute bricks 102 and 104 in a first rack 106 are selectively coupled to memory resources (e.g., DRAM DIMMs, NVDIMMs, etc.) in memory bricks 108 and 110 in a second rack 112. Each of compute bricks 102 and 104 include an FPGA (Field Programmable Gate Array 114 and multiple ports 116. Similarly, each of memory bricks 108 and 110 include an FPGA 118 and multiple ports 120. The compute bricks also have one or more compute resources such as CPUs, or Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. Compute bricks 102 and 104 are connected to the memory bricks 108 via ports 116 and 120 and switch or interconnect 122, which represents any type of switch or interconnect structure. For example, under embodiments employing Ethernet fabrics, switch/interconnect 122 may be an Ethernet switch. Optical switches and/or fabrics may also be used, as well as various protocols, such as Ethernet, InfiniBand, RDMA (Remote Direct Memory Access), NVMe-oF (Non-volatile Memory Express over Fabric, RDMA over Converged Ethernet (RoCE), etc. FPGAs 114 and 118 are programmed to perform routing and forwarding operations in hardware.

Generally, a compute brick may have dozens or even hundreds of cores, while memory bricks, also referred to herein as pooled memory, may have terabytes (TB) or 10's of TB of memory implemented as disaggregated memory. An advantage is to carve out usage-specific portions of memory from a memory brick and assign it to a compute brick (and/or compute resources in the compute brick). The amount of local memory on the compute bricks is relatively small and generally limited to bare functionality for operating system (OS) boot and other such usages.

One of the challenges with disaggregated architectures is the overall increased latency to memory. Local memory within a node can be accessed within 100 ns (nanoseconds) or so, whereas the latency penalty for accessing disaggregated memory resources over a network is much higher.

The current solution for executing such applications on disaggregated architectures being pursued by hyperscalers is to tolerate high remote latencies (that come with disaggregated architectures) to access hot tables or structures and rely on CPU caches to cache as much as possible locally. However, this provides less than optimal performance and limits scalability.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
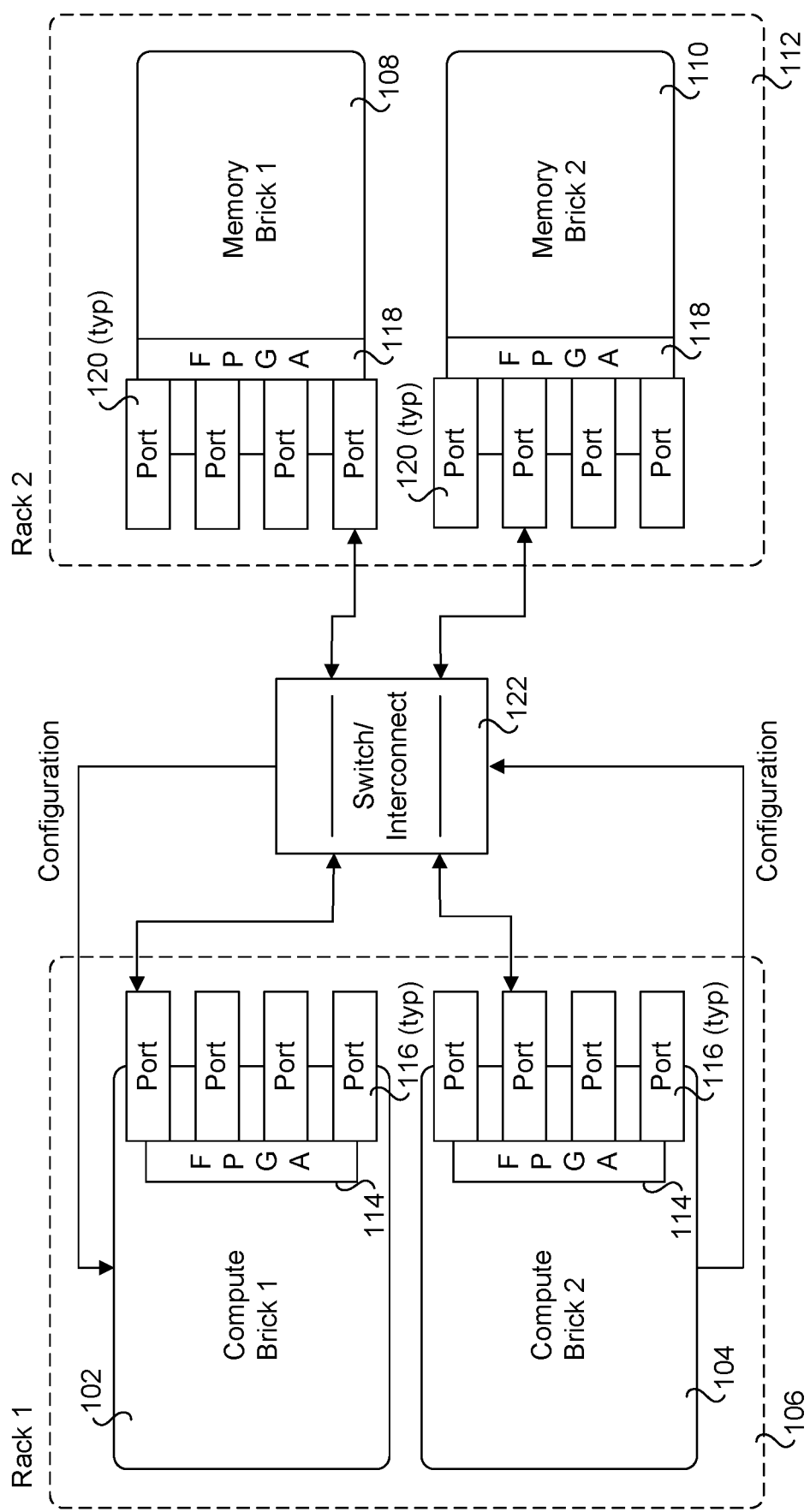
FIG. 1 is a schematic diagram illustrating an example of a disaggregated architecture in which compute resources in compute bricks are connected to disaggregated memory in memory bricks.

Embodiments of methods and apparatus for software-defined coherent caching of pooled memory are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

With datacenter applications like in-memory databases, memory footprints run into terabytes or 10's of TBs. This is a great fit for hyperscalers to deploy on disaggregated memory bricks, while maintaining their goals of uniform landscapes. In these applications, there is often "hot" data that needs to be cached locally for faster access; for example, a set of hash tables or locks or index tables in a database deployment. There are three key observations (and challenges) to be noted about caching hot data in these applications:

First, the data to be cached is often dependent on the software context. For example, usage scenario A, when XYZ queries are observed implies table T is going to be a hot table or usage scenario B where PQR transactions are observed implies structure S is going to be a hot structure.

Second, multi-tenancy is often used in such hyperscaler deployments—and this is a critical point in examining this problem—with 100's of cores in a compute brick in the GNR timeframe, one can easily deploy 10's of applications on such compute bricks. Now consider the scenario where each tenant has a requirement for a different hot data structure that is 10's or 100's of gigabytes (GB).

Third, the caching needs to be done coherently with the processors. Currently, processor caches (L1 (Level 1), L2 (Level 2), L3/LLC (Level 3 or Last Level Cache) are in the coherent domain but they are very limited in capacity (MBs) compared to caching requirements of 100's of GBs. Further, they cannot be used to pin down data structures.

Another need is for managing the data in the cache based on the software-defined caching policy. For example, it is not possible to cache all the data in the processor caches, which are too small in capacity and incapable of pinning entire tables, and an implementation under current approaches could have potential ping-pong effects of data thrashing back and forth.

In accordance with aspects of the embodiments disclosed herein, a solution that meets the foregoing needs of disaggregated memory architectures is provided. The solution provides a mechanism for software-defined pinning down of large data structures from disaggregated remote memory to a local cache that is in the same coherent domain as the processors. The solution also includes means for the software-defined caching policies to be defined on a per-tenant basis to enable each tenant to run its software independently.

Example embodiments of the solution are illustrated in the following figures. In accordance with one aspect the Network Interface Controller (NIC) capabilities are expanded to include mechanisms to enable software stacks to influence how data is cached within a coherent domain. In other embodiments, similar functionality is implemented in a processor SoC with an embedded NIC or a processor SoC with embedded logic coupled to an SoC.

In one embodiment, the NIC includes a Coherent Agent (called CA+) that is responsible for implementing the same coherent protocols that the CPU implements. This CA+ is responsible for processing IDI (Intra-Die Interconnect) requests (snoops, read for ownership (RFO), etc.) coming from the CA on the CPU (e.g., via CXL (Compute Express Link).cache).

The CA+ manages coherence of a set of 1 . . . N disaggregated memory (DM) caches (each of them logically mapped to a particular application or service). Hence, any of the requests will potentially generate invalidations or requests from ownerships to lines on these DM caches. For instance, if read for ownership comes from a line that is hosted in DM Cache 1 (mapped into an SAP application), the CA+ will invalidate the line for DM Cache 1 and send it to the core requesting that line.

Each of these DM caches has associated logic (one or more software-defined caching policies) that is responsible for taking care of the caching policy. Also, the lines that are evicted from the CPU to the pooled memory will go through the associated logic in case they decide to cache those lines in their corresponding DM cache (in coordination with the CA+). Hence, the software-defined caching policy can decide what is important to evict and what needs to reside in the NIC or other hardware in which the software-defined caching policies are implemented.

Each of these software-defined caching policies are programable by the software stack (e.g. using a bit-stream that runs on an embedded component on the NIC or is part of the programmable logic in an FPGA or accelerator).

An aspect of the embodiments is that they implement a kind of man in the middle software-guided caching scheme that does not allow the software stack to play with the existing coherency protocols. The software-defined caching policies are implemented in the NIC (or other hardware device) to intercept evictions from local DM caches to the remote memory pool and re-evaluated to determine whether the evicted line is relevant for a specific service. As shown in the figures herein, a CA+ as well as new DM caches are embedded in a NIC or other hardware device. Hence, the software-defined caching policies are implemented separately from the coherent domain implemented by the CPU. This provides benefits including keeping consistency and avoiding potential threats.

Embodiments of the solution expose how these new DM caches are exposed to the software stacks and propose a variant where this approach can be potentially taken when the pooled memory is not accessed over a NIC or its local memory. The embodiments provide a way to have stickiness among the various efforts in the pooled memory schemes and enables more advanced features to the software stacks to mitigate latencies when accessing remote pooled memory resources. Note that most of the stacks (e.g., an in-memory database such as SAP HANA) have a very good understanding on how their data structures work.

Figure 2:
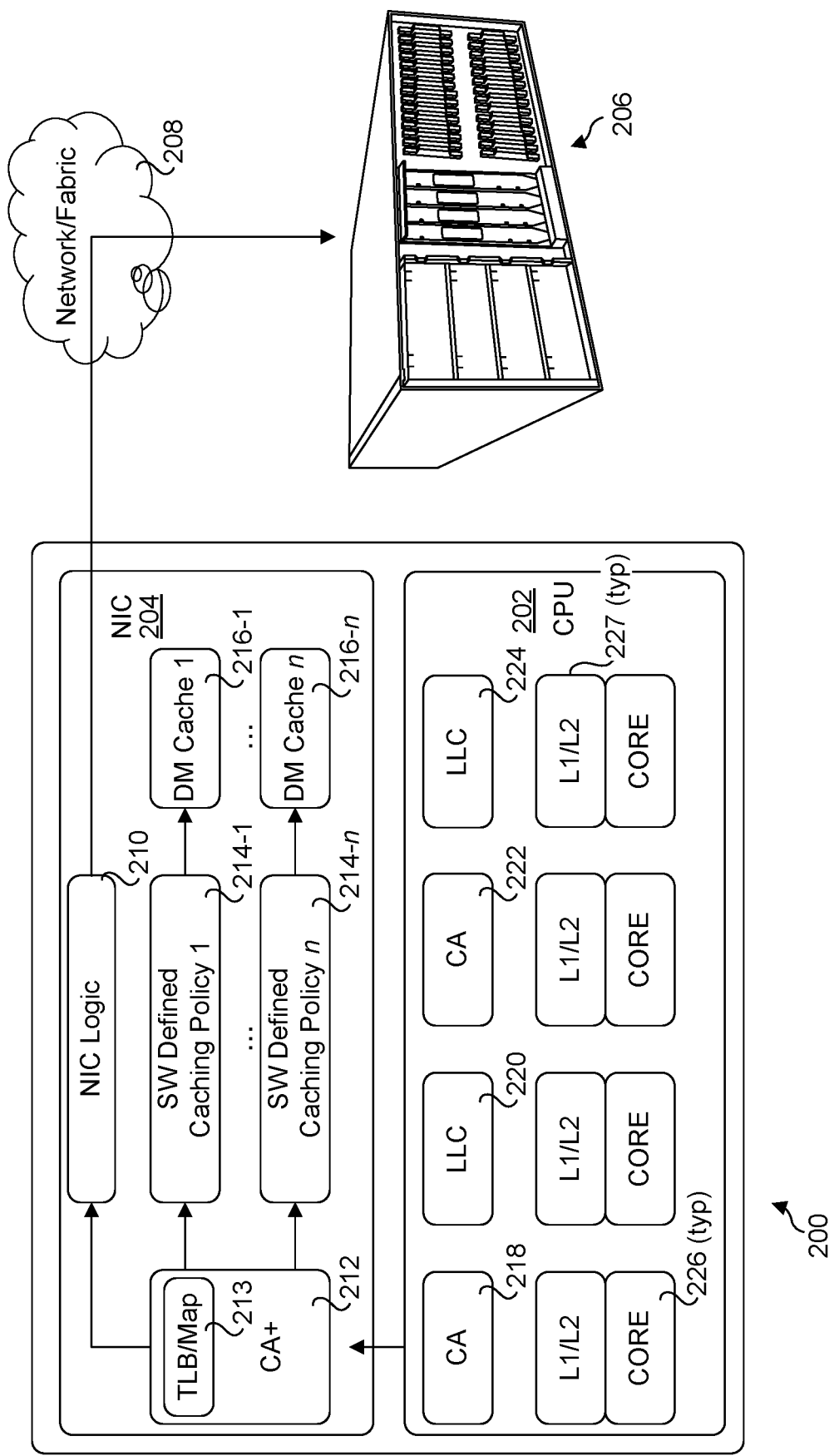
FIG. 2 is a schematic diagram of a compute platform implementing software-defined caching policies on a NIC coupled to a CPU, according to one embodiment.

FIG. 2 shows a high-level view of a system architecture according to an exemplary implementation of a system in which the solution is implemented. The system includes a compute platform 200 having a CPU 202 and a NIC 204 coupled to pooled storage 206 via a network or fabric 208. NIC 204 includes NIC logic 210 (e.g., logic for implementing conventional NIC operations including network/fabric communication), a CA+ 212, and n software-defined caching policies 214-1 . . . 214-*n* used for accessing respective DM caches 216-1 . . . 216-*n*. CPU 202 includes CAs 218 and 222, LLCs 220 and 224, and multiple cores 226 with L1/L2 caches 227. Generally, the number of cores may range from four upwards, with four shown in the figures herein for simplicity.

Figure 3:
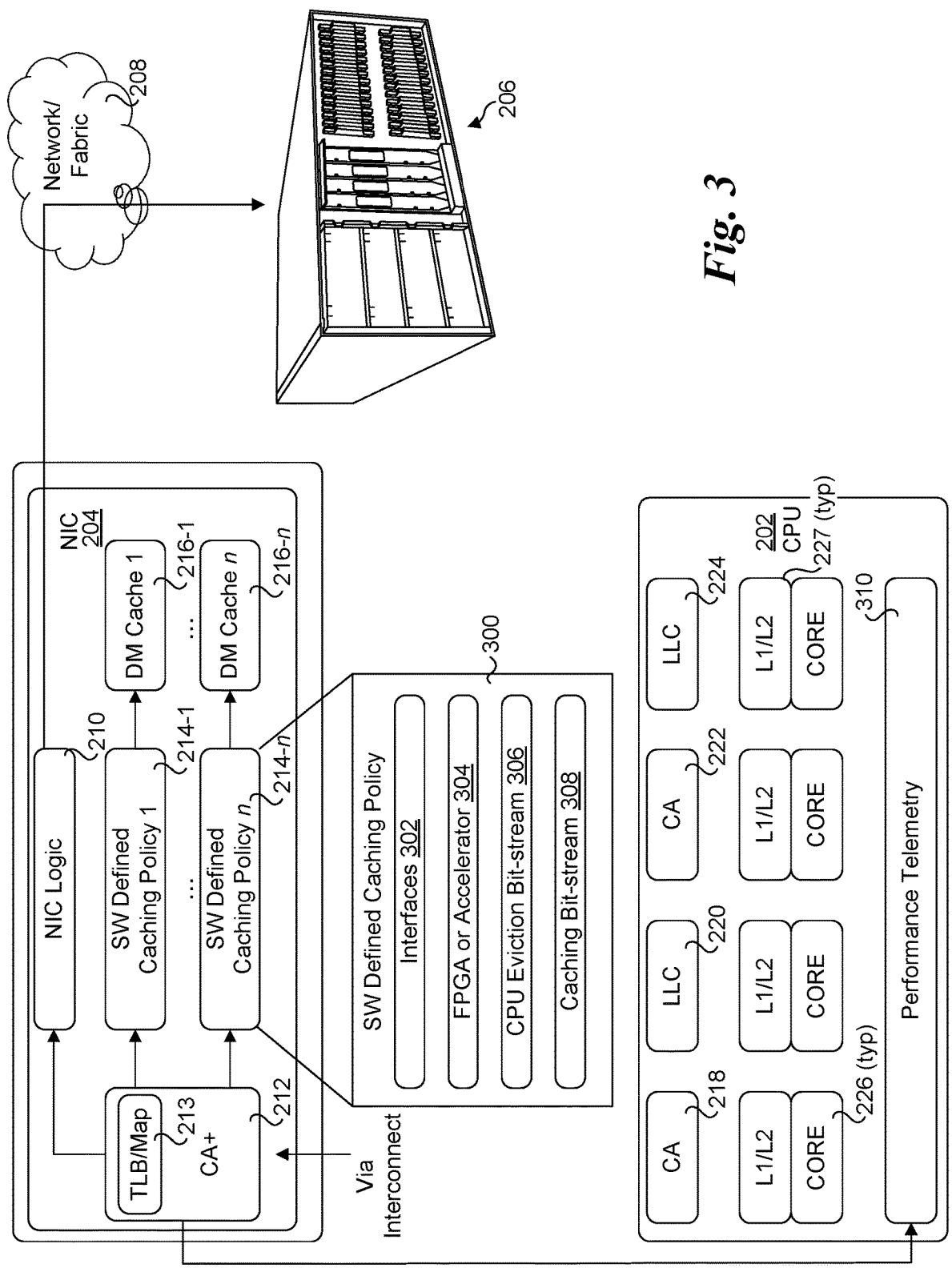
FIG. 3 is a schematic diagram illustrating further details of the software-defined caching policies for the compute platform of FIG. 2.

FIG. 3 shows further details of NIC 204 and CPU 202 including an example of a software-defined caching policy 300, which includes interfaces 302, an FPGA or accelerator 304, a CPU eviction bit-stream 306, and a caching bit stream 308. CPU 202 is further depicted as including a performance telemetry block 310.

CA+ 212 is responsible for maintaining coherency between the CPU caches (e.g., LLCs 220 and 224) and local DM caches 216-1-216-n. In embodiments where the LLC(s) is/are non-exclusive, cache coherency may be maintained at lower cache levels, such as L2 caches on the CPU. In one embodiment, CA+ 212 implements the same coherency protocol as CAs 218 and 222 on CPU 202. In addition, CA+ 212 tracks which cache lines are currently in local DM caches 216-1-216-n. For example, tracking may be implemented using a TAG-based structures or other mapping mechanisms.

In some embodiments a translation look-aside buffer (TLB) may be used by the software-defined caching policies to translate virtual address from the application to physical addresses. The bit-streams may not know that a Physical Address (@PA) being evicted is mapped into a hot data structure with a Virtual Address (@VA). Accordingly, the TLB can be used by the software-defined caching policies to understand that a @PA is mapped to @VA and determine whether this @VA is key or not.

In the drawings herein, the combination of the TLB and mapping structure/mechanism is depicted as a TLB/Map 213. It will be understood that the TLB and map (e.g., TAG-based structure) will generally be implemented as separate components/logic.

In one embodiment, when NIC 204 is connected to CPU 202 it checks that the CPU SKU hosted into the platform where the NIC is attached is consistent with the coherency protocol of the NIC. The NIC may support multiple versions of coherency protocols.

CA+ 212 is configured to intercept the evictions from CPU 202 going to pooled memory 206. CA+ 212 will check with one or more of software-defined caching policies 214-1 . . . 214-n to see if it is willing to cache that line or needs to be evicted to pooled memory 206.

Generally, a software-defined caching policy is configured to:
a) Decide what lines need to be kept into the DM cache that is managing instead of being evicted to the pooled memory.
b) Decide what lines need to be evicted when a line is decided to be evicted from the local DM cache to remote pooled memory (when a) happens).

Interface 302 is exposed to the system software stack (e.g., running on a core or cores 226 in CPU 202) to register instances of CPU eviction bit-stream 306 and caching bit-stream 308, which will be responsible for implementing the caching policies on behalf of a particular application (via programming logic, such as programming gates on an FPGA or accelerator). Generally, the system software stack can allow some applications to register their own caching policies or register pre-defined policies for the type of application.

CPU eviction bit-stream 306 is used for programming logic on NIC 204 that is responsible for checking cache line evictions coming from CPU 202 (and provided by CA+ 212) and decide whether it is relevant to keep the cache line in the DM local cache (e.g., a DM cache 216 on NIC 204). In the affirmative case, the logic will notify CA+ 212 and the CA+ will track that that local DM cache has this line and notify host CPU (202) that the line has not been evicted to the pooled memory (e.g. updating the snoop filter).

Caching bit-stream 308 is used for programming logic on NIC 204 that is responsible for deciding what lines need to be evicted from the local cache (for the software-defined cache policy) when evictions for CPU 202 occur. In this case, the caching logic will respond by notifying CA+ 212 that a particular line has been chosen to be evicted from the local cache and CA+ 212 will implement the proper coherency scheme to CPU 202 and other caches to check whether the line needs to be evicted to pooled memory 206 (e.g., is the last copy of the line). In some embodiments, there is an interface (not separately shown) to the bit-stream to handle PA-to-VA and/or VA-to-PA mapping since software works with virtual addresses while memory employs physical addresses.

One or multiple FPGAs or accelerators 304 are implemented to execute CPU eviction bit-stream 308 and caching bit-stream 306. Depending on the implementation, when there are M supported software stacks a single FPGA may host all the M×2 bit-streams (2 bit-streams per stack). Alternatively, multiple FPGAs or accelerators may be implemented.

Figure 4:
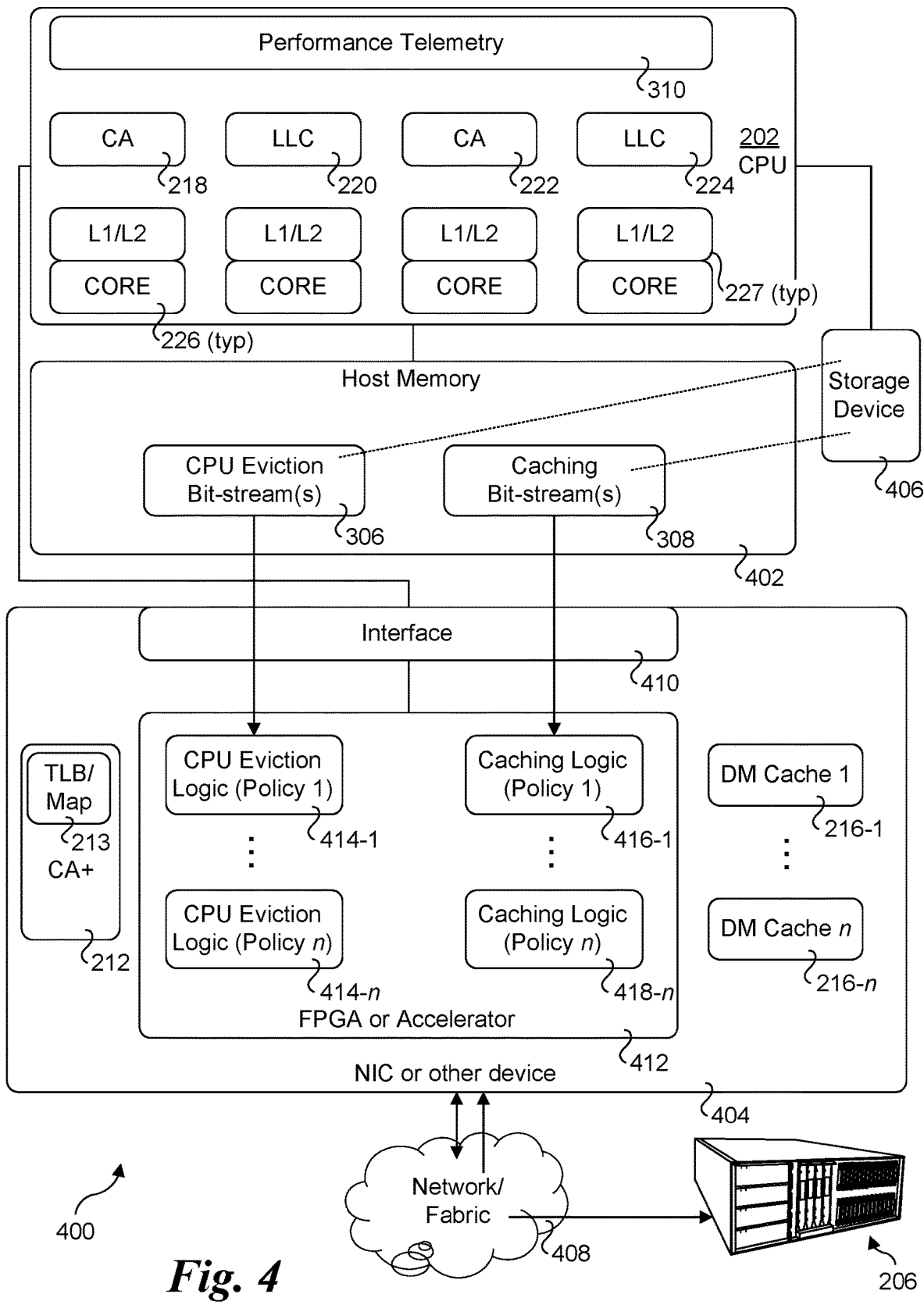
FIG. 4 is a schematic diagram illustrating the use of CPU eviction bit-streams and caching bit-streams used to program logic on a NIC or other device to effect software-defined caching policies, according to one embodiment.

FIG. 4 shows a platform architecture 400 includes a CPU 202 coupled to each of host memory 402, NIC or other device 404, and a storage device 406. NIC or other device 404 represents any device that may be implemented to effect the logic and functionality illustrating being performed by NIC 204 in FIGS. 2 and 3. NIC or other device 404 includes an interface 410 and one or more FPGAs or accelerators 412 (one of which is shown). NIC or other device 404 further include the components and logic shown for NIC 204, as depicted by CA+ and DM caches 216-1 . . . 216-n. Other components for NIC 204 are also included but are not illustrated in FIG. 4 for clarity and simplicity.

CPU eviction bit-streams 306 and caching bit-streams comprise the bit-streams used to program corresponding software-define eviction policies and software-defined caching policies using programmable logic on FPGA or accelerator 412. The programmed logic blocks are depicted as CPU eviction logic 414-1 . . . 414-n, which are respectively programmed to implement software-defined cache eviction policies 1 . . . n. Similarly, caching bit-streams 308 are used to program caching logic 416-1 . . . 416-n, which are respectively programmed to implement software-defined caching policies 1 . . . n.

Generally, CPU 202 may load the software that is run on the platform for storage device 406 or over network/fabric 408. This software will include CPU eviction bit-streams 306 and caching bit-streams 308 in addition to other software not shown, such as an operating system and virtualization components. In one embodiment the operating system is a Linux operating system, and the virtualization components include any of a Type-1 hypervisor, Type-2 hypervisor, or container virtualization layer that are used to host one or more virtual machines or containers in which the software application (for which the software-defined caching policies) are run. These software components and application also would be loaded into host memory 402 and executed on one or more cores 226 on CPU 202.

Figure 5:
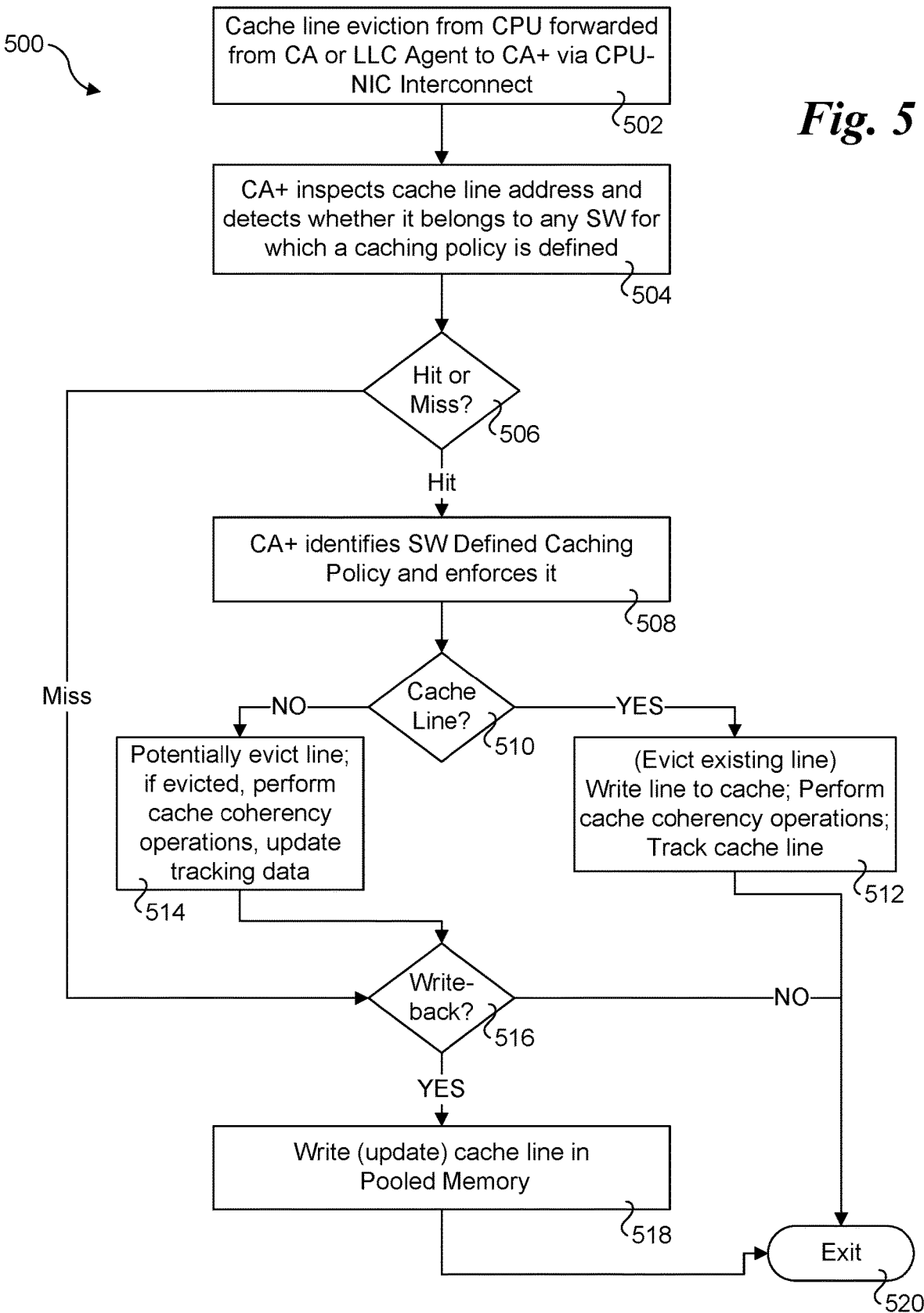
FIG. 5 is a flowchart illustrating operations and logic for implementing software-defined caching policies under the architectures of FIGS. 2, 2a, 2b, 3, and 4, according to one embodiment.

FIG. 5 shows a flowchart illustrating operations and logic implemented by NIC or other device 404 in response to a cache line eviction from CPU 402, according to one embodiment. For simplicity, NIC or other device 404 is a NIC in the following discussion and is referred to as NIC 404.

The process begins in a block 502 with a cache line eviction from CPU 402 forwarded from a CA or LLC agent via a CPU-NIC interconnect and interface 410 to CA+ 212 on NIC 404. Interface 410 performs any applicable data/protocol conversions and forwards corresponding information to CA+ 212. In a block 504 the CA+ inspects the cache line address and detects whether it belongs to any software for which a caching policy is defined. For example, in one embodiment the CA+ maintains a map of address spaces associated with software application that have registered cache policies with the CA+.

In a decision block 506 the CA+ determined whether there is a Hit (address belongs to registered software) or Miss (address does not). For a Hit the logic proceeds to a block 508 in which the CA+ identifies the software-defined caching policy to be applied to the cache line and enforces that policy. In connection with block 508, the CA+ determines whether the line should be cached (in consideration of the software-defined caching policy), with the outcome depicted by a decision block 510. If the line is to be cached, the answer to decision block 510 is YES and the line is written to the local cache associated with the software-defined caching policy (e.g., one of local caches 216-1 . . . 216-n) in a block 512. If the local cache is full, the CA+ will select an existing cache line to evict based on an applicable cache eviction policy and implement an associated coherency scheme to the CPU and other caches to check whether the line needs to be evicted to the pooled memory. The CA+ will also track that it has this cache line (e.g., update/add a TLB entry or other cacheline mapping information) and that the cache line has not been evicted to host memory. The CA+ will also perform cache coherency operations associated with the evicted cache line. After the line is written the logic exits, as depicted by an exit block 520.

Generally, it is expected that a given cache line will be managed by one software-defined caching policy. However, under some embodiments a given cache line may be shared across applications. Accordingly, on an evict from the CPU there may be more than one software application that may want to keep the line in local cache. In this case, the logic may implement a round-robin evaluation for each of multiple software-defined cache policies to determine what to do with the line.

If the software-defined caching policy is to not cache the line or if the cache line eviction corresponds to a type of eviction calling for clearing the line, the answer to decision block 510 is NO and the logic proceeds to a block 514 in which the cache line is potentially evicted. For example, some processors support a cache eviction instruction that instructs all levels of caches to evict the line. This is useful for application threads that have completed and thus no longer need potentially cached data the threads were using. Normally, the evictions would extend to the LLC; however, the local caches on the NIC operate as an extra level of cache (beyond the LLC), and thus such an eviction instruction would likewise apply to local caches on the NIC. If the cache line is evicted, associated cache coherency operations will be performed and the CA+ tracking data will be updated to reflect the line has been evicted. When an existing line is a DM cache is evicted, the software-defined caching policy associated with the DM cache is used to select the line to evict and evict that line to pooled memory.

Returning to decision block 506, for a Miss the logic proceeds to a decision block 516 in which a determination is made to whether the cache line eviction corresponds to a memory write-back. Decision block 516 also may apply following potential eviction of the cache line in block 514. If a memory write-back is to be performed (answer to decision block 516 is YES), the logic proceeds to a block 518 in which the cache line is written to pooled memory 206. For example, the NIC logic will write the cache line to a physical address on a DIMM, NVDIMM, etc. in pooled memory 206 using applicable transport and memory protocols. In practice, a memory write-back results in the data for an existing cache line being overwritten, thus updating the cache line data. If a memory write-back does not apply, the answer to decision block 516 is NO and the process proceeds to exit block 520.

Figure 6:
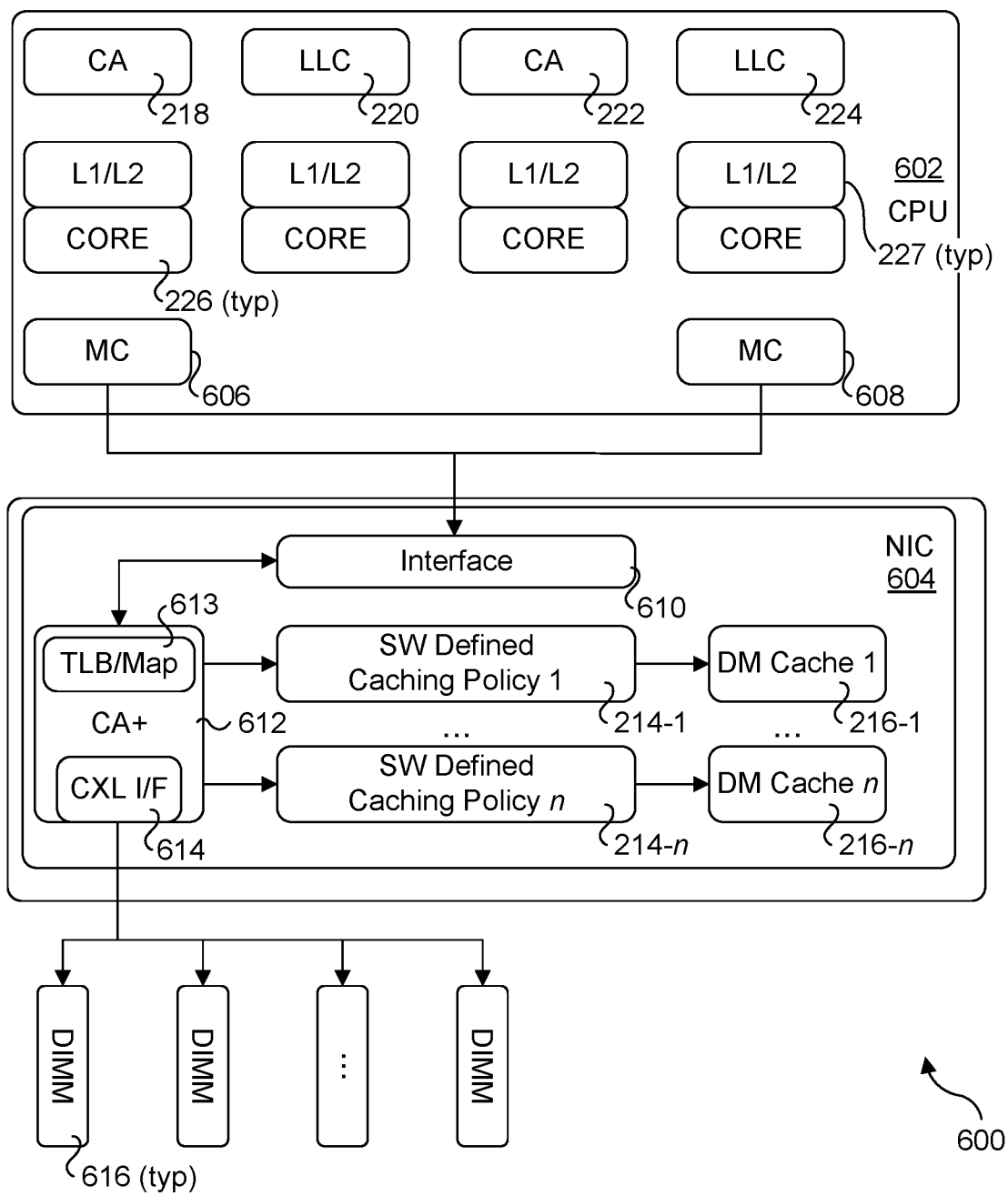
FIG. 6 is a schematic diagram illustrating an implemented of software-defined caching policies under a platform architecture including a plurality of DIMMs coupled to a NIC; according to one embodiment.

FIG. 6 depicts a platform architecture 600 under which pooled memory is connected locally using, e.g., CXL or any other interconnect supporting access to memory that is locally attached to the platform. The general concept is to have a man in the middle block (similar to that described above implemented by NIC 204) that intercepts the evictions from the CPU and decides whether an evicted cache line has to go to memory or not.

CPU 602 has similar components as CPU 202 with the further addition of memory controllers (MCs) 606 and 608. NIC 604 is similar to NIC 204/404 including an interface 610 and wherein a CA+ 612 (similar to CA+ 212) includes a TLB/map 613 and further includes a CXL interface (I/F) 614. CXL interface is coupled to a plurality of DIMMs 616. Generally, DIMMs 616 may be installed on one or more circuit boards (not shown) with CXL interfaces or may comprise DIMMs that include build-in CXL interfaces.

In one embodiment, CPU 602 is a conventional CPU (e.g., a server CPU) with memory controllers 606 and 608 support an existing memory interface/protocol, such as DDR4 or DDR5. Optionally, CPU 602 is implemented as a custom System on a Chip (SoC), and memory controllers 606 and 608 support an I/O interconnect and protocol, such as PCIe (Peripheral Component Interconnect Express) or CXL.

In the case of memory controllers 606 and 608 supporting DDR4 or DDR5 or similar memory interface/protocol, interface 610 is configured to emulate a DDR4 or DDR5 memory device, such as a DDR4/DDR5 DIMM. Interface 610 also converts the data access request to cache lines or other memory units in the memory address space(s) implemented by DIMMs 616 to facilitate, in combination with CA+ 612 and CXL interface 614, CPU access to the memory address space(s).

Figure 7:
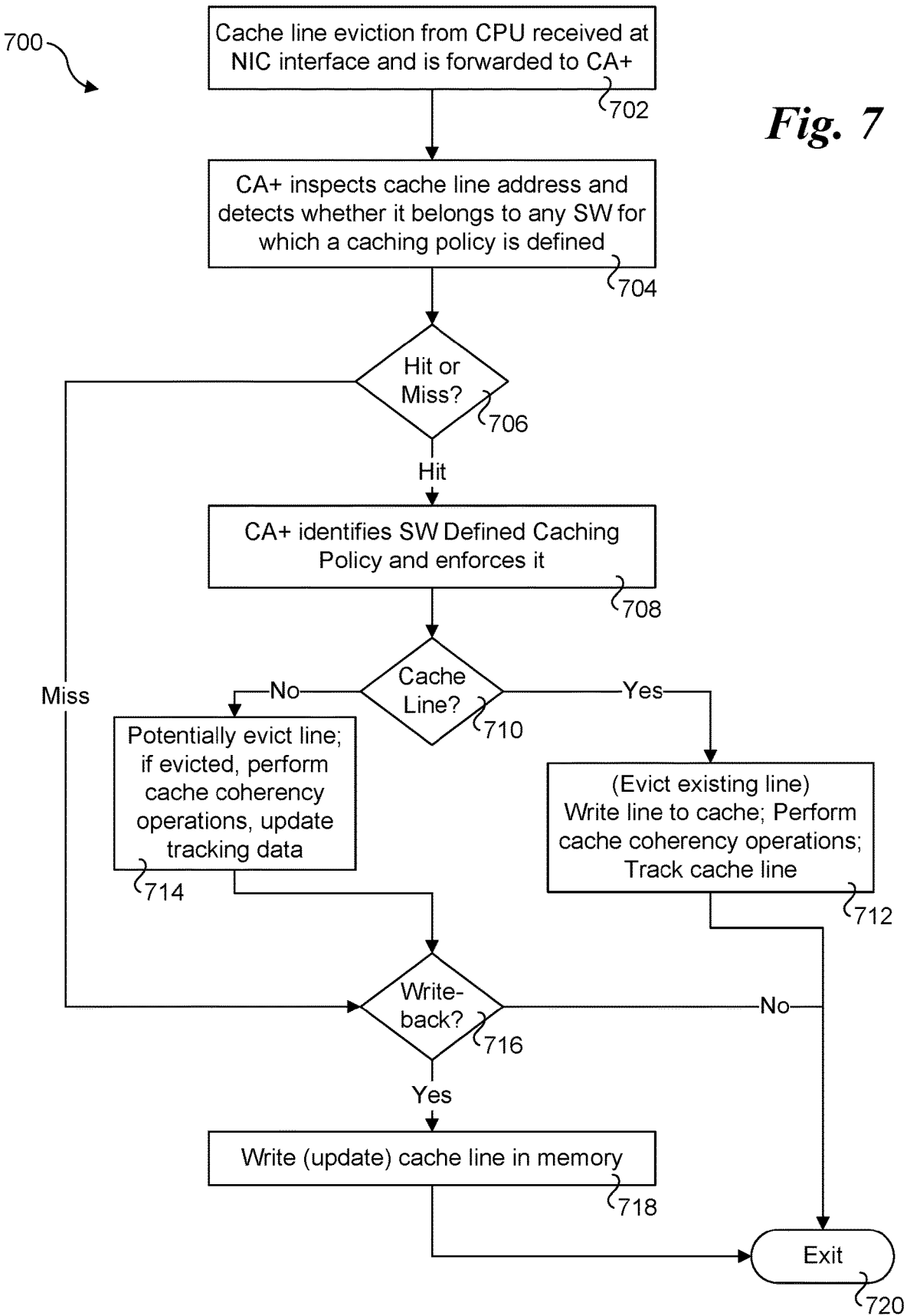
FIG. 7 is a flowchart illustrating operations and logic for implementing software-defined caching policies under the architecture of FIG. 6, according to one embodiment.

FIG. 7 shows a flowchart illustrating operations and logic implemented by NIC 604 in response to a cache line eviction from CPU 602, according to one embodiment. The process begins in a block 702 with a cache line eviction being received at NIC interface 410 from CPU 602. Interface 610 performs any applicable data/protocol conversions and forwards corresponding information to CA+ 612. In a block 704 the CA+ inspects the cache line address and detects whether it belongs to any software for which a caching policy is defined. As before, in one embodiment the CA+ maintains a map of address spaces associated with software application that have registered cache policies with the CA+.

In a decision block 706 the CA+ determined whether there is a Hit (address belongs to registered software) or Miss (address does not). For a Hit the logic proceeds to a block 508 in which the CA+ identifies the software-defined caching policy to be applied to the cache line and enforces that policy. In connection with block 508, the CA+ determines whether the line should be cached based on the software-defined caching policy, with the result depicted in a decision block 710. If the line is to be cached, the answer to decision block 710 is YES and the line is written to the local cache associated with the software-defined caching policy (e.g., one of local caches 216-1 . . . 216-*n*) in a block 712. If the local cache is full, the CA+ will select an existing cache line to evict based on an applicable cache eviction policy and implement an associated coherency scheme to the CPU and other caches to check whether the line needs to be evicted to the pooled memory. The CA+ will also track that it has this cache line (e.g., update/add a TLB entry or other cacheline mapping information) and that the cache line has not been evicted to host memory. After the line is written the logic exits, as depicted by an exit block 720.

If the software-defined caching policy is to not cache the line or if the cache line eviction corresponds to a type of eviction calling for clearing the line, the answer to decision block 710 is NO and the logic proceeds to a block 714 in which the cache line is potentially evicted in a manner similar to block 514 in flowchart 500. If the cache line is evicted, associated cache coherency operations will be implemented and the CA+ tracking data will be updated to reflect the line has been evicted.

Returning to decision block 706, for a Miss the logic proceeds to a decision block 716 in which a determination is made to whether the cache line eviction corresponds to a memory write-back. Decision block 716 also may apply following potential eviction of the cache line in block 714. If a memory write-back is to be performed (answer to decision block 716 is YES), the cache line is written to memory by CXL interface 614. For example, the CXL interface will write the cache line to a physical address on one of DIMMs 616. As before, a memory write-back results in the data for an existing cache line being overwritten, thus updating the cache line data. If a memory write-back does not apply, the answer to decision block 516 is NO and the process proceeds to exit block 520.

Figure 2A:
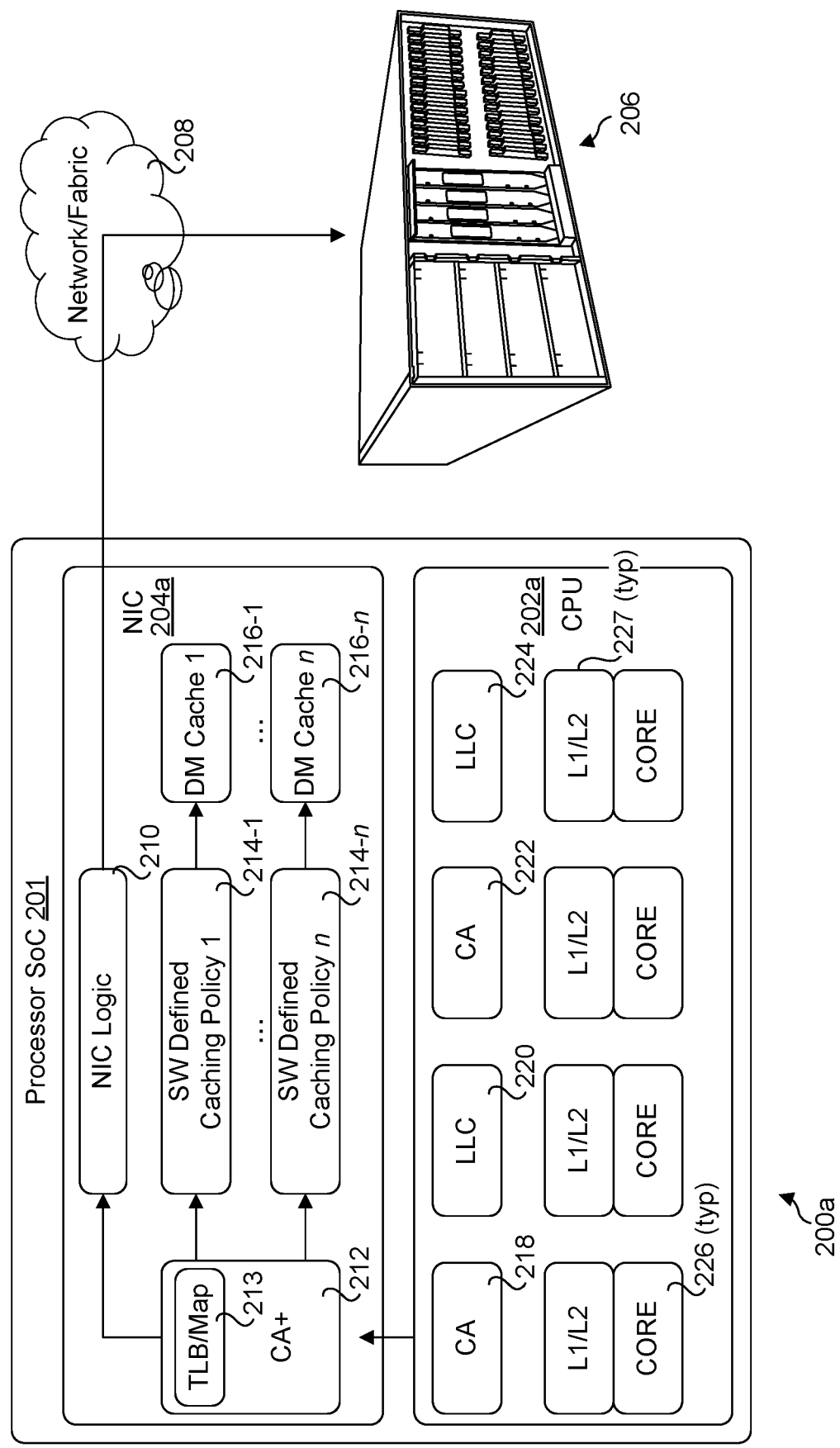
FIG. 2a is a schematic diagram of a compute platform implementing software-defined caching policies in a NIC embedded on a processor SoC including a CPU, according to one embodiment.

In the foregoing embodiments, the CPU and NIC (or other device) are depicted as separate components. Alternatively, similar functionality could be implemented on a System on a Chip (SoC), such as shown in FIG. 2*a*, which shows a compute platform 200*a* including a processor SoC 201 having a CPU 202*a* and an embedded NIC 204*a*. Most aspects of compute platforms 200 and 200*a* of FIGS. 2 and 2*a* are similar, with the following differences. Rather than have an external interconnect or link between the CPU and the NIC, under the architecture in FIG. 2*a*, embedded NIC 204*a* is connected to CPU 202*a* via an internal interconnect, which may employ various interconnect structures and protocols. For example, the internal interconnect may comprise but is not limited to Intel® QuickPath Interconnect (QPI), Intel® Ultra Path Interconnect (UPI), Intel® On-Chip System Fabric (IOSF), Omnipath, CXL, HyperTransport, Advanced Microcontroller Bus Architecture (AMBA) interconnect, OpenCAPI, Gen-Z, Cache Coherent Interconnect for Accelerators (CCIX), and a PCIe (internal) interconnect.

In one embodiment, cores 226 and L1/L2 caches 227 are implemented in the CPU "core," while other components are implemented in the CPU "uncore," meaning the portion of circuitry that is not part of the core. The internal interconnect may be a coherent interconnect in some embodiments, thus supporting memory coherency through the DM cache layer. Alternative, memory coherency for the L1/L2 caches and LLC may use a separate coherency domain from the DMA cache layer.

Figure 2B:
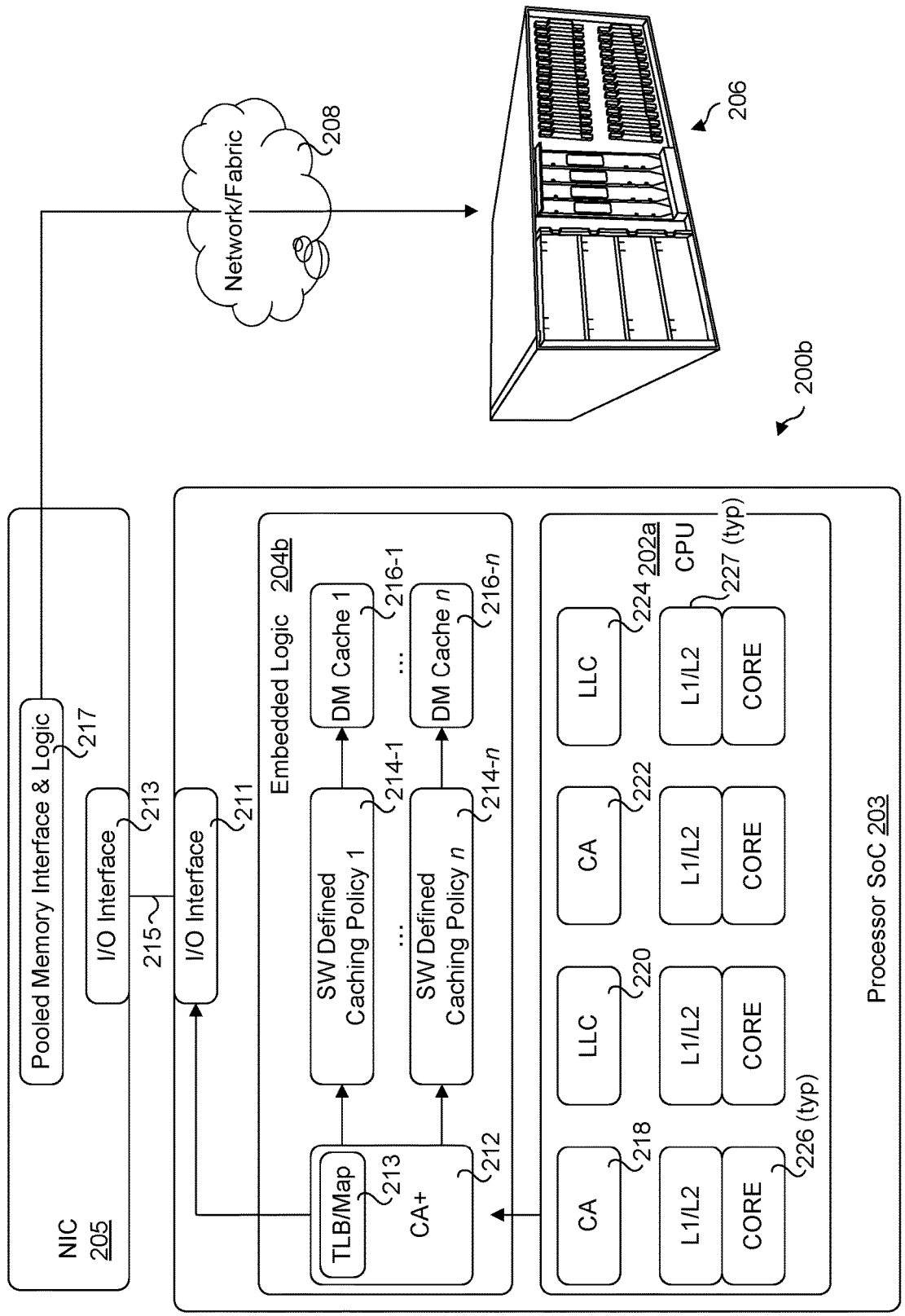
FIG. 2b is a schematic diagram of a compute platform implemented software-defined caching policies embedded in hardware on a processor SoC coupled to a NIC, according to one embodiment.

In addition to an embedded NIC, similar functionality with respect to the software-defined caching policies and DM caches may be embedded in a logic block or IP (Intellectual Property) block on an processor SoC that is attached to a separate NIC or other type of network interface. An example of this configuration is shown in FIG. 2*b*, which depicts a compute platform 200*b* including a processor SoC 203 having an embedded logic block 204*b* that is coupled to a NIC 205 via I/O interfaces 211 and 213 and an I/O link 215. NIC 205 further includes pooled memory interface and logic 217, which is configured to support data transfer between platform 200*b* and pooled memory 206 via network/fabric 208. Generally, components with like reference numbers in embedded logic block 204*a*, NIC 204*a* and NIC 204 perform similar functions.

Under the architecture of computer platform 200*b*, DM caches 216-1 . . . 216-*n* may be in the same coherency domain as L1/L2 caches 217 and LLCs 220 or 224, or may be in a separate coherency domain. Under some embodiments, DM caches 216-1 . . . 216-*n* are operated as Level 4 caches, while LLCs 220 and 224 are operated as Level 3 caches.

Figure 6A:
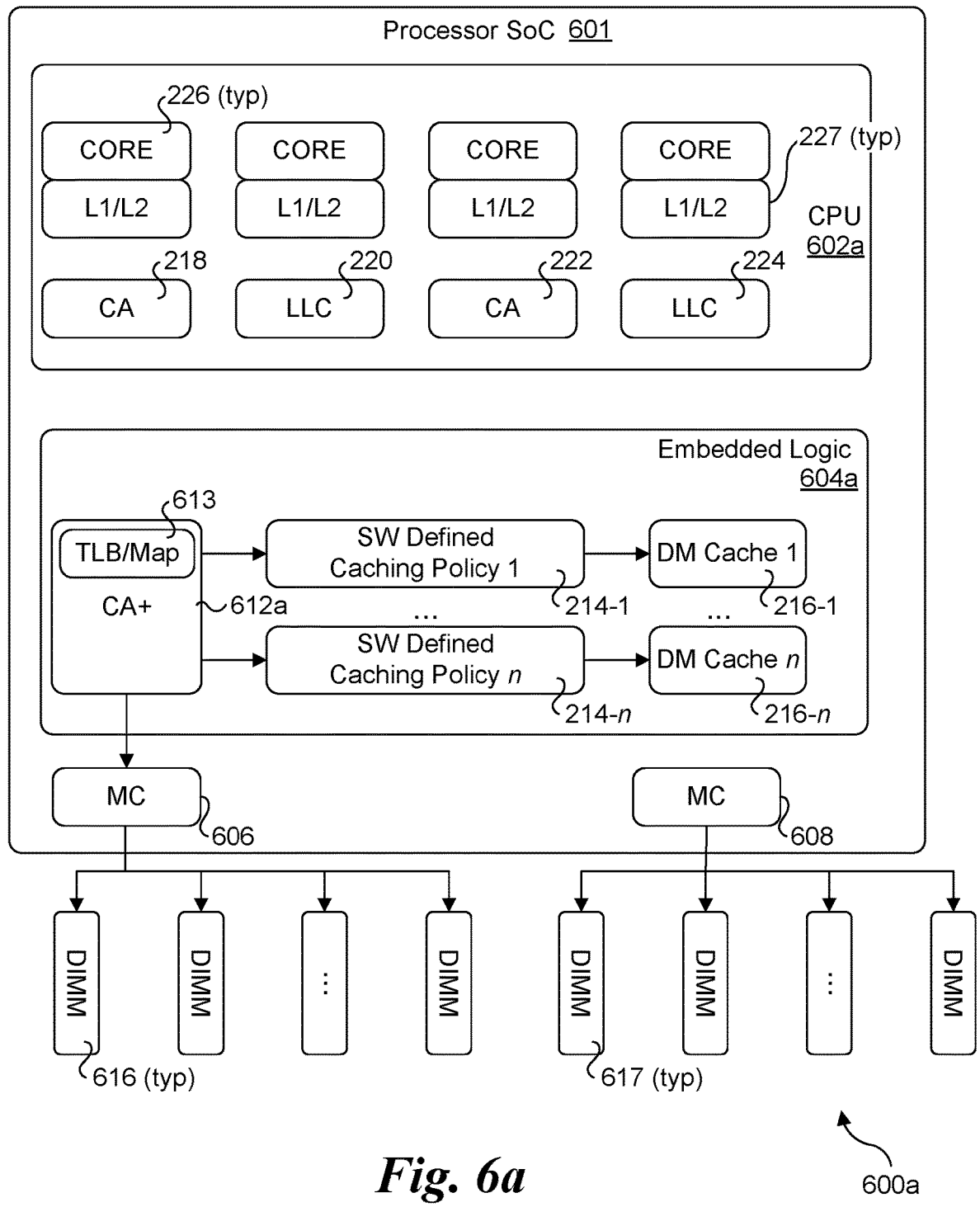
FIG. 6a is a variant of the architecture of FIG. 6 under which the software-defined caching policies and associate hardware-based logic are embedded on a processor SoC, according to one embodiment.

FIG. 6*a* shows an alternative platform architecture 600*a* including a processor SoC 601 with a CPU 602*a* and an embedded logic block 604*a* with a CA+ 612*a* including a TLB/map 613. As before, components with the same references in platform architectures 600 and 600*a* perform similar functions. Under the embedded logic block approach, memory controllers 606 and 608 operate in their normal manner using conventional memory access channels and protocols (e.g., DDR4/DDR5). Other memory access protocols are listed below. Under the illustrated embodiment, physical memory for DIMMs 616 is available for software-defined cache usage, while physical memory for DIMMs 617 is used in the conventional manner (e.g., correspond to a memory/cache architecture including L1/L2 caches 227 and LLCs 220 and 224 DIMMs 617).

Example Platform/Server

Figure 8:
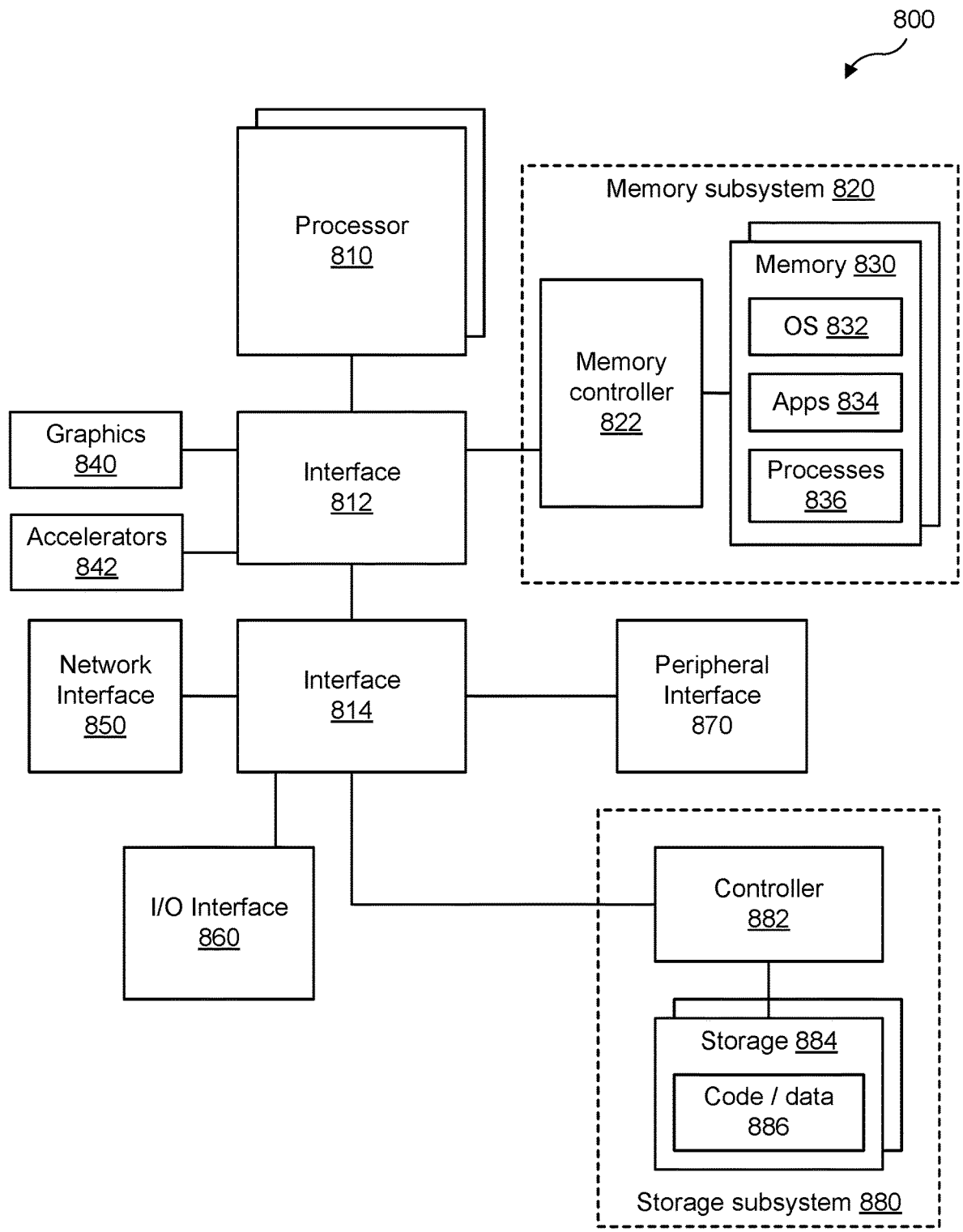
FIG. 8 is a diagram of a compute platform or server that may be implemented with aspects of the embodiments described and illustrated herein.

FIG. 8 depicts a compute platform or serve 800 (hereinafter referred to compute platform 800 for brevity) in which aspects of the embodiments disclosed above may be implemented. Compute platform 800 includes one or more processors 810, which provides processing, operation management, and execution of instructions for compute platform 800. Processor 810 can include any type of microprocessor, central processing unit (CPU), graphics processing unit (GPU), processing core, multi-core processor or other processing hardware to provide processing for compute platform 800, or a combination of processors. Processor 810 controls the overall operation of compute platform 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 800 includes interface 812 coupled to processor 810, which can represent a higher speed interface or a high throughput interface for system components that needs higher bandwidth connections, such as memory subsystem 820 or optional graphics interface components 840, or optional accelerators 842. Interface 812 represents an interface circuit, which can be a standalone component or integrated onto a processor die. Where present, graphics interface 840 interfaces to graphics components for providing a visual display to a user of compute platform 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

In some embodiments, accelerators 842 can be a fixed function offload engine that can be accessed or used by a processor 810. For example, an accelerator among accelerators 842 can provide data compression capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of compute platform 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in compute platform 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for compute platform 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

While not specifically illustrated, it will be understood that compute platform 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute platform 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides compute platform 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. Various embodiments can be used in connection with network interface 850, processor 810, and memory subsystem 820.

In one example, compute platform 800 includes one or more I/O interface(s) 860. I/O interface 860 can include one or more interface components through which a user interacts with compute platform 800 (e.g., audio, alphanumeric, tactile/touch, or other interfacing). Peripheral interface 870 can include any hardware interface not specifically mentioned above. Peripherals refer generally to devices that connect dependently to compute platform 800. A dependent connection is one where compute platform 800 provides the software platform or hardware platform or both on which operation executes, and with which a user interacts.

In one example, compute platform 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (i.e., the value is retained despite interruption of power to compute platform 800). Storage 884 can be generically considered to be a "memory," although memory 830 is typically the executing or operating memory to provide instructions to processor 810. Whereas storage 884 is nonvolatile, memory 830 can include volatile memory (i.e., the value or state of the data is indeterminate if power is interrupted to compute platform 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of compute platform 800. More specifically, power source typically interfaces to one or multiple power supplies in compute platform 800 to provide power to the components of compute platform 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, compute platform 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, CXL, HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

The use of the term "NIC" herein is used generically to cover any type of network interface, network adaptor, interconnect (e.g., fabric) adaptor, or the like, such as but not limited to Ethernet network interfaces, InfiniBand HCAs, optical network interfaces, etc. A NIC may correspond to a discrete chip, blocks of embedded logic on an SoC or other integrated circuit, or may be comprise a peripheral card (noting NIC also is commonly used to refer to a Network Interface Card).

While some of the diagrams herein show the use of CPUs, this is merely exemplary and non-limiting. Generally, any type of XPU may be used in place of a CPU in the illustrated embodiments. Moreover, as used in the following claims, CPUs and all forms of XPUs comprise processing units.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'N' or 'n' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.).

The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A compute platform comprising:
   a central processing unit (CPU) having one or more cores on which software is executed including a plurality of software applications;
   memory coupled to the CPU into which software is loaded;
   hardware-based logic, either embedded on a System on a Chip (SoC) including the CPU or implemented in a discrete device coupled to the CPU;
   a network interface including one or more ports configured to be coupled to a network or fabric via which disaggregated memory is accessed;
   wherein execution of a portion of the software programs the hardware-based logic to implement, for each of one or more of the plurality of software applications, a software-defined caching policy to effect caching of at least a portion of an address space in the disaggregated memory allocated for the software application, and wherein data are cached in one or more disaggregated memory (DM) caches embedded on the SoC or embedded on the discrete device.

2. The compute platform of claim 1, wherein the hardware-based logic is implemented in the network interface and a Network Interface Controller (NIC) including one or more DM caches and including one or more ports coupled to disaggregated memory in one or more pooled memory devices via the network or fabric.

3. The compute platform of claim 2, wherein the hardware-based logic comprises programmable logic in a Field Programmable Gate Array (FPGA) or accelerator, wherein execution of a portion of the software programs one or more software-defined caching policies using programable logic in the FPGA or accelerator by executing software by sending one or more bit-streams to the FPGA or accelerator, wherein the one or more bit-streams are used to configure programmable logic in the FPGA or accelerator.

4. The compute platform of claim 3, wherein the one or more bit-streams comprise at least one CPU eviction bit-stream used to program the FPGA or accelerator to process cache evictions from the CPU and at least one caching bit stream used to program the FPGA or accelerator to effect a caching policy in connection with a cache line in an associated DM cache being evicted.

5. The compute platform of claim 1, further comprising a caching agent, implemented on the SoC or discrete device, wherein the compute platform is configured to:
forward a cache line eviction from the CPU to the caching agent; and
determine if the cache line eviction corresponds to a cache line in a DM cache.

6. The compute platform of claim 5, wherein when it is determined the cache line eviction corresponds to a cache line in a DM cache, the hardware-based logic is configured to enforce a software-defined caching policy for the DM cache.

7. A network interface controller (NIC), configured to be installed in or attached to a compute platform, comprising:
one or more ports, configured to be connected to a network or fabric via which one or more pooled memory devices comprising disaggregated memory (DM) are accessed;
an input/output (I/O) interface, configured to be coupled to a central processing unit (CPU) of the compute platform;
at least one distributed memory (DM) cache;
hardware based logic to, for each of one or more software applications running on the compute platform, implement a caching policy to effect caching of disaggregated memory in an associated DM cache of at least a portion of an address space allocated for the software application in the disaggregated memory.

8. The NIC of claim 7, wherein the hardware-based logic comprises programmable logic in a Field Programmable Gate Array (FPGA) or accelerator, and wherein the NIC is configured to receive bit-streams via the I/O interface sent from software running on the compute platform to program programable logic in the FPGA or accelerator to implement associated software-defined caching policies.

9. The NIC of claim 8, wherein the bit-streams comprise at least one CPU eviction bit-stream used to program the FPGA or accelerator to process cache evictions from the CPU and at least one caching bit stream used to program the FPGA or accelerator to effect a caching policy in connection with a cache line in an associated DM cache being evicted.

10. The NIC of claim 7, further comprising a caching agent, wherein the NIC is further configured to:
receive a cache line eviction from the CPU at the I/O interface;
forward the cache line eviction to the caching agent; and
determine if the cache line eviction corresponds to a cache line in a DM cache.

11. The NIC of claim 10, wherein when it is determined the cache line eviction corresponds to a cache line in a DM cache, the hardware-based logic is configured to enforce a software-defined caching policy for the DM cache.

12. A method implemented in an environment employing compute resources operatively coupled to disaggregated memory, comprising:
for each of one or more software applications hosted by a compute resource,
implementing a caching policy in hardware for effecting disaggregated memory (DM) caching in an associated DM cache of at least a portion of an address space allocated for the software application in the disaggregated memory.

13. The method of claim 12, wherein a compute resource comprises a compute platform including a processing unit having a cache hierarchy comprising multiple cache levels and the hardware for effecting DM caching comprises hardware-based logic either embedded on a processor System on a Chip (SoC) including the processing unit or included on a device coupled to the processing unit, wherein the hardware-based logic is configured to effect one or more software-defined caching policies.

14. The method of claim 13, wherein the hardware-based logic is implemented in a Network Interface Controller (NIC) including one or more DM caches and including one or more ports coupled to disaggregated memory in one or more pooled memory devices via a network or fabric.

15. The method of claim 13, wherein the hardware-based logic comprises programmable logic in a Field Programmable Gate Array (FPGA) or accelerator, further comprising:
programming one or more software define caching policies using programable logic in the FPGA or accelerator by executing software on a central processing unit (CPU) of the compute platform to send one or more bit-streams to the FPGA or accelerator, wherein the one or more bit-streams are used to configure programmable logic in the FPGA or accelerator.

16. The method of claim 15, wherein the one or more bit-streams comprise at least one CPU eviction bit-stream used to program the FPGA or accelerator to process cache evictions from the CPU and at least one caching bit stream used to program the FPGA or accelerator to effect a caching policy in connection with a cache line in an associated DM cache being evicted.

17. The method of claim 13, wherein the processing unit comprises a central processing unit (CPU) further comprising:
forwarding a cache line eviction from the CPU to an agent implemented by the hardware-based logic; and
determining if the cache line eviction corresponds to a cache line in a DM cache.

18. The method of claim 17, further comprising:
when it is determined the cache line eviction corresponds to a cache line in the DM cache, enforcing a software-defined caching policy for the DM cache.

19. The method of claim 17, further comprising:
  evicting a cache line from a DM cache; and
  performing cache coherency operations associated with eviction of the cache line.

20. The method of claim 12, wherein a software-defined caching policy is effected, in part, by an caching agent implemented in hardware, and wherein the caching agent employs at least one of a translation look-aside buffer (TLB) and a cache line mapping mechanism to track the cache lines being cached by one or more DM caches.

* * * * *